United States Patent
Mo et al.

(10) Patent No.: US 7,454,218 B2
(45) Date of Patent: Nov. 18, 2008

(54) METHOD OF BAND MULTIPLEXING TO IMPROVE SYSTEM CAPACITY FOR A MULTI-BAND COMMUNICATION SYSTEM

(75) Inventors: Shaomin Samuel Mo, Monmouth Junction, NJ (US); Alexander D. Gelman, Smallwood, NY (US)

(73) Assignee: Panasonic Corporation, Osaka (JP)

( * ) Notice: Subject to any disclaimer, the term of this patent is extended or adjusted under 35 U.S.C. 154(b) by 601 days.

(21) Appl. No.: 11/207,520

(22) Filed: Aug. 19, 2005

(65) Prior Publication Data

US 2007/0054680 A1 Mar. 8, 2007

(51) Int. Cl.
*H04B 7/00* (2006.01)

(52) U.S. Cl. .............. 455/502; 455/452.2; 455/574; 370/222; 370/311; 370/328; 370/329; 370/347; 370/395.4; 370/493; 375/130

(58) Field of Classification Search .......... 455/502
See application file for complete search history.

(56) References Cited

U.S. PATENT DOCUMENTS

| | | | | |
|---|---|---|---|---|
| 5,210,750 | A * | 5/1993 | Nassehi et al. ............ 370/440 |
| 5,229,993 | A * | 7/1993 | Foudriat et al. ........... 370/445 |
| 5,583,866 | A * | 12/1996 | Vook et al. ................ 370/312 |
| 6,665,311 | B2 * | 12/2003 | Kondylis et al. .......... 370/462 |
| 6,747,959 | B1 * | 6/2004 | Ho ........................... 370/282 |
| 7,254,399 | B2 * | 8/2007 | Salokannel et al. ....... 455/452.2 |
| 2002/0132630 | A1 * | 9/2002 | Arazi et al. ............... 455/502 |
| 2002/0160779 | A1 * | 10/2002 | Arazi et al. ............... 455/444 |
| 2003/0012176 | A1 * | 1/2003 | Kondylis et al. .......... 370/348 |
| 2005/0036475 | A1 | 2/2005 | Fumihiro et al. |
| 2005/0213612 | A1 * | 9/2005 | Pister et al. ............... 370/503 |
| 2005/0237965 | A1 * | 10/2005 | Kuperschmidt et al. .... 370/321 |
| 2005/0238084 | A1 * | 10/2005 | Kuperschmidt et al. .... 375/133 |
| 2005/0243782 | A1 * | 11/2005 | Sakoda et al. ............ 370/338 |
| 2005/0249183 | A1 * | 11/2005 | Danon et al. ............. 370/347 |
| 2006/0039341 | A1 * | 2/2006 | Ptasinski et al. .......... 370/338 |
| 2006/0040701 | A1 * | 2/2006 | Long et al. ............... 455/525 |

(Continued)

FOREIGN PATENT DOCUMENTS

WO WO/2005/039127 4/2005

(Continued)

OTHER PUBLICATIONS

Ebrahim Saberinia et al, Multi-user UWB-OFDM Communications, IEEE, 2003 pp. 127-130.

(Continued)

*Primary Examiner*—Matthew Anderson
*Assistant Examiner*—Hai V Nguyen
(74) *Attorney, Agent, or Firm*—RatnerPrestia

(57) ABSTRACT

A control method of synchronizing communications between or among a plurality of devices in a communication system includes detecting beacons from the plurality of devices in the communication system, and establishing a reservation for at least a portion of the plurality of devices in the communication system. Each reservation is a frame interval in which to transmit symbols from one device to one or more of the other devices in the communications system. Each frame interval and intra-frame interval is set according to the established reservation. Each frame interval and intra-frame interval is a plural, integral number of symbol periods in duration.

20 Claims, 11 Drawing Sheets

U.S. PATENT DOCUMENTS

| | | | |
|---|---|---|---|
| 2006/0050708 A1* | 3/2006 | Shapiro et al. | 370/394 |
| 2006/0087984 A1* | 4/2006 | Kim et al. | 370/252 |
| 2006/0126847 A1* | 6/2006 | Ho | 380/277 |
| 2006/0188003 A1* | 8/2006 | Larsson | 375/130 |
| 2006/0239220 A1* | 10/2006 | Celentano et al. | 370/328 |
| 2006/0268891 A1* | 11/2006 | Heidari-Bateni et al. | 370/395.4 |
| 2006/0281476 A1* | 12/2006 | Lane et al. | 455/502 |
| 2007/0002803 A1* | 1/2007 | Destino et al. | 370/335 |
| 2007/0002809 A1* | 1/2007 | Reunamaki et al. | 370/338 |
| 2007/0014273 A1* | 1/2007 | Kuperschmidt et al. | 370/347 |
| 2007/0019607 A1* | 1/2007 | Sugaya et al. | 370/347 |
| 2007/0042795 A1* | 2/2007 | Mo et al. | 455/502 |
| 2007/0054680 A1* | 3/2007 | Mo et al. | 455/502 |
| 2007/0232244 A1* | 10/2007 | Mo et al. | 455/91 |
| 2007/0263567 A1* | 11/2007 | Habetha et al. | 370/329 |
| 2007/0274206 A1* | 11/2007 | Habetha et al. | 370/222 |
| 2007/0291636 A1* | 12/2007 | Rajagopal et al. | 370/208 |
| 2008/0013510 A1* | 1/2008 | Salokannel et al. | 370/338 |
| 2008/0137577 A1* | 6/2008 | Habetha | 370/311 |

FOREIGN PATENT DOCUMENTS

| | | |
|---|---|---|
| WO | WO/2005/039133 | 4/2005 |

OTHER PUBLICATIONS

J. O'Conor, R. Brown, MBOA Technical Specification: Distributed Medium Access Control (MAC) For Wireless Networks, MBOA MAC Specification Draft 0.90, Dec. 31, 2004.

Romano Fantacci, Daniele Tarchi, Gregorio Izzo, Multimedia Traffic Management at MAC Layer, in IEEE 802.15.3a Personal Area Networks Wireless Networks, Communications and Mobile Computing, 2005 International Conference on Maui, HI, USA Jun. 13-16, 2005, Piscataway, NJ, USA, IEEE, pp. 923-928, XP00100888085.

M. P. Wylie-Green et al., Multi-band OFDM UWB Solution for IEEE 802.15.3a WPANs Advances in Wired and Wireless Communication, 2005 IEEE/Sarnoff Symposium on Princeton, NJ, USA Apr. 18-19, 2005, pp. 102-105, XP010793757.

G. R. Hiertz et al., IEEE 802,15.3a Wireless Personal Area Networks—The MBOA Approach European Wireless Conference, XX, XX, Apr. 2005, pp. 1-7, XP002329983.

International Search Report Jan. 10, 2007.

* cited by examiner

FIG. 3
PRIOR ART

Time-Frequency Codes for Band Groups 1-4

| Channel Number | T1 | T2 | T3 | T4 | T5 | T6 |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 2 | 1 | 1 | 1 | 1 |
| 6 | 2 | 2 | 2 | 2 | 2 | 2 |
| 7 | 3 | 3 | 3 | 3 | 3 | 3 |

FIG. 5A

Time-Frequency Codes

| Channel Number | T1 | T2 | T3 | T4 | T5 | T6 |
|---|---|---|---|---|---|---|
| 1 | 1 | 2 | 3 | 1 | 2 | 3 |
| 2 | 3 | 1 | 2 | 3 | 1 | 2 |
| 3 | 2 | 3 | 1 | 2 | 3 | 1 |

FIG. 5B

Time-Frequency Codes

| Channel Number | T1 | T2 | T3 | T4 | ... | TN |
|---|---|---|---|---|---|---|
| 1 | 1 | 2 | 3 | 4 | ... | N |
| 2 | N | 1 | 2 | 3 | ... | N-1 |
| 3 | N-1 | N | 1 | 2 | ... | N-2 |
| 4 | N-2 | N-1 | N | 1 | ... | N-3 |

METHOD OF BAND MULTIPLEXING TO IMPROVE SYSTEM CAPACITY FOR A MULTI-BAND COMMUNICATION SYSTEM

FIELD OF THE INVENTION

The present invention relates to the field of wireless communications and, more particularly, to a method of band multiplexing to improve system capacity for a multi-band communication system.

BACKGROUND OF THE INVENTION

Ultra Wideband (UWB) technology uses base-band pulses of very short duration to spread the energy of transmitted signals very thinly from near zero to several GHz. This technology is presently in use in military applications. Commercial applications will soon become possible due to a recent Federal Communications Commission (FCC) decision that permits the marketing and operation of consumer products incorporating UWB technology.

Presently, UWB is under consideration by the Institute of Electrical and Electronic Engineers (IEEE) as an alternative physical layer technology. See IEEE Standard 802.15.3a, which is designed for home wireless audio/video systems. This standard sets forth that UWB systems should operate well in an environment of uncoordinated piconets. Piconets, sometimes referred to as personal area networks (PANs), are formed when at least two devices, such as a portable PC and a cellular phone, connect.

Packet error rates (PER) can be attributed to narrow band interference (NBI) and to collision of-packets (i.e., symbols or information bits) transmitted on common communication (e.g., frequency) bands. "Multi-band" modulation technologies have been developed for UWB communication systems to deal with NBI. In multi-band UWB communication systems, the UWB frequency band is divided into multiple sub-bands utilizing a different spreading waveform in each sub-bands. One of the major advantages of the multi-band UWB system is its flexibility of working in environments with NBI. When NBI is detected, multi-band UWB systems may automatically shut down the corresponding sub-bands shared with the NBI to reduce the effect of NBI. Time/frequency hopping may be utilized in multi-band UWB systems to further reduce NBI effects.

FIG. 1 is a conceptual representation of a multi-band spectrum allocation for a UWB communication system which is in accordance with FCC mandates for such systems. The UWB spectrum of 7.5 GHz in the 3.1 GHz to 10.6 GHz frequency band is divided into 14 bands and each of bands 1-14 occupies 528 MHz of bandwidth. Bands 1-14 are grouped into band groups 1-5. For devices using UWB communications support for band group 1 is mandatory while it is optional for band groups 2-5.

FIG. 2A is a schematic diagram of a conventional superframe used for communications among a plurality of UWB devices in the UWB communication system.

FIG. 2B is an exemplary grouping of UWB devices. Although 3 UWB devices are shown any number of devices may be included in the UWB communication system.

Referring now to FIGS. 2A and 2B, because there is no central controller for piconet management, UWB devices A, B, and C from different but overlapping piconets coordinate themselves. Beaconing technology may be used for piconet management. Each UWB device A, B and C may transmit a respective beacon during a respective beacon slot S1-S3 and may listen to other UWB devices A, B and C for their beacons. Beacons from UWB devices A, B and C in a common area 20 may form a beacon group. When, for example, UWB device B joins an existing beacon group of UWB device A and C, its beacon is placed at the end of the beacon group in beacon slot S3. When, for example, UWB device A leaves the beacon group, other UWB devices B and C move their beacons forward to beacon slots S1 and S2, respectively, to make the beacon group as short as possible. Short beacon groups allow for more time in the super frame to allocate for data exchange.

The basic timing structure for data exchange is a superframe 200, 201 and 202. Superframe 200, 201 and 202 comprises (1) a beacon period (BP) 210, which is used to set timing allocations and to communicate management information for the piconet; (2) a priority channel access (PCA) period 220, which is a contention-based channel access that is used to communicate commands and/or asynchronous data; and (3) a distributed reservation protocol (DRP) period 230, which enables UWB devices A, B and C to reserve reservation blocks 240-1, 240-2 . . . 240-N outside of BP 210 of superframes 200, 201 and 202. DRP period 230 may be used for commands, isochronous streams and asynchronous data connections. Reservations made by UWB device A, B and C specify one or more reservation blocks 240-1, 240-2 . . . 240-N that UWB device A, B and C may use to communicate with one or more other UWB devices A, B and C on the piconet. UWB devices A, B and C using DRP period 230 for transmission or reception may announce reservations by including DRP Information Elements (IEs) in their beacons.

Each UWB device A, B and C may reserve an integral number of reservation blocks 240-1, 240-2 . . . 240-N (e.g., reservations are made in units of reservation blocks). UWB devices A, B and C may reserve multiple reservation blocks which may not be consecutive. That is, these multiple reservation blocks may have portions which are consecutive and other portions which are not consecutive. UWB devices A, B and C may reserve excess reservation blocks for error correction relevant retransmission and other control data, among others. Each UWB device A, B and C starts transmission at the beginning of a respective reserved reservation block.

Each reservation block 240-1, 240 . . . 240-N may include a plurality of frames 260 and may include intra-frame periods 270 and 280 such as MIFS periods, SIFS periods and a Guard period, among others. Conventionally, these intra-frame periods 270 and 280 are fixed duration periods, for example, typically, the MIFS period is 1.875 µs, the SIFS period is 10 µs, and the Guard period is 12 µs. These periods are not integer multiples of a symbol period.

UWB devices A, B and C may simultaneously transmit symbols (i.e., information bits) during frames 260 using Orthogonal Frequency Division Multiplexing (OFDM) modulation. Symbols may be interleaved across various bands to exploit frequency diversity and provide robustness against multi-path interference.

A simultaneously operating piconet (SOP) refers to, for example, multiple UWB devices A, B and C which may operate as different piconets in a common coverage area 20. When these devices A, B and C are used in apartment buildings, for example, the probabilities is high that multiple SOPs are operating. One major challenge for communication systems is dealing with interference caused by multiple SOPs that operate nearby.

FIG. 3 is a chart illustrating a conventional time-frequency code for band groups 1-4 illustrated in FIG. 1. For each band group 1-4, channels 1-7 may be established such that UWB device A may communicate over channel 1, UWB device B may communicate over channel 2 and UWB device C may communicate over channel 3. That is, for example, (1) in a first symbol period T1, UWB devices A, B, and C may communicate over frequency band 1; (2) in a second symbol period T2, UWB device A may communicate over frequency band 2, UWB device B may communicate over frequency band 3, and UWB device C may communicate over frequency band 1; (3) in a third symbol period T3, UWB device A may communicate over frequency band 3, and UWB devices B and C and may communicate over frequency band 2. Each channel may have a unique time/frequency hopping scheme, also referred to as a time-frequency code (TFC).

To support multiple SOPs and avoid interference, the information bits (i.e., symbols) are spread using the TFC. Typically, there are two types of TFCs used: ones in which symbols are interleaved over multiple bands, referred to as Time-Frequency Interleaving (TFI); and ones in which symbols are transmitted on a single band, referred to as Fixed Frequency Interleaving (FFI). Typically, each of the band groups 1-4 support both TFI and FFI.

For example, UWB devices communicating over channels 1-4 may use TFI, while UWB devices communicating over channels 5-7 may completely avoid collision by using FFI. However, because all symbols from one UWB device using, for example, channel 5 are transmitted on frequency band 1, total transmission power for frequency band 1 from the one UWB device is 4.7 dB higher than if distributed over frequency bands 1-3. Correspondingly, the FCC mandates that transmitters on channels 5-7, be required to reduce transmission power by 4.7 dB which results in a reduced coverage range.

A problem exists with the conventional communication systems that a plurality of UWB devices A, B and C may become unsynchronized due to the duration of reservation blocks 240-1, 240-2 . . . 240-N and these intra-frame periods 270 and 280. This can occur when UWB devices A, B and C start transmission at different reservation blocks. This can also occur even if previous frames 260 are synchronized with proper time-frequency codes and offsets and may cause increased collisions between communications from UWB devices A, B and C transmitted on common frequency bands.

What is needed is a communication system capable of synchronization of multiple UWB devices to increase system capacity.

SUMMARY OF THE INVENTION

The present invention is embodied as a control method to synchronize communications from a plurality of devices in a communication system. The control method includes detecting beacons from the plurality of devices in the communication system, establishing a reservation for at least a portion of the plurality of devices in the communication system, each reservation being a frame interval to transmit symbols from one device to one or more other devices in the communications system, and setting each frame interval and intra-frame interval according to the established reservation, each frame interval and intra-frame interval being a plural, integral number of symbol periods in duration.

The present invention may also be embodied as a method of controlling synchronization of a plurality of devices during a plurality of frames of a superframe in a communication system. The method includes detecting beacons from the plurality of devices in the communication system, setting each frame interval and each intra-frame interval of the superframe to be a plural, integral number of symbol periods in duration, and aligning a start of each of the frame intervals of the superframe according to the detected one or more beacons.

The present invention may also be embodied as a control method of band multiplexing communications from the plurality of devices in the communication system. The method includes synchronizing frame intervals among the plurality of devices, frame intervals being intervals in which symbol data is transmitted, by setting each frame interval and each intra-frame interval to be a plural, integral number of symbol periods, rotating a transmission frequency among a plurality of frequency bands for each device, and transmitting one or more symbols from each device at each of the rotated transmission frequencies such that simultaneous transmissions by respective devices are at different transmission frequencies.

The present invention may also be embodied as a computer readable carrier including software that is configured to control a general purpose computer to implement a method embodied in a computer readable medium to control communication from a device in the communication system. The method includes detecting beacons from a plurality of other devices in the communication system, establishing a reservation for the device, the reservation being a frame interval to transmit symbols from the device to one or more other devices in the communications system, and setting each frame interval and intra-frame interval according to the established reservation, each frame interval and intra-frame interval being plural, integral number of symbol periods in duration.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover in the drawings, common numerical references are used to represent like features/elements. Included in the drawing are the following figures:

FIG. 3 (Prior Art) is a chart illustrating a conventional time-frequency code for band groups 1-4 of FIG. 1;

FIGS. 5A and 5B are charts illustrating exemplary time-frequency codes in accordance with the embodiment of the present invention;

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

UWB communication systems, which may include UWB devices A, B and C are generally known in the art, for example, as illustrated and disclosed in U.S. application Ser. No. 10/751,366 invented by the Inventor of this application, and entitled "METHOD AND APPARATUS FOR RECOVERING DATA IN A RECEIVED CONVOLUTION-ENCODED DATA STREAM." Moreover, the inventor is one of the authors of two industry alliance specifications, namely "MULTIBAND OFDM PHYSICAL LAYER SPECIFICATION, Making High-Speed Wireless A Reality", Release 0.99, published Dec. 14, 2004 and "MBOA TECHNICAL SPECIFICATION DISTRIBUTED MEDIUM ACCESS CONTROL (MAC) FOR WIRELESS NETWORKS", MBOA MAC Specification Draft 0.90, published Dec. 31, 2004.

Although the present invention is described in terms of UWB communication systems, the present invention may be applied to other communication systems such as non-UWB frequency-hopping and time-hopping communication systems. For example, it is contemplated that embodiments of the present invention may be applicable generally to multi-band communication systems. In such a system, the communication structure (e.g., superframe) may have sub-intervals (e.g., frame periods and intra-frame periods, among others) that are integer multiples of a base period (e.g., a symbol or a time-frequency period) to improve synchronization of the transmission of data over the multi-band communication system.

It should be understood that the method illustrated may be implemented in hardware, software, or a combination thereof. In such embodiments, the various components and steps described below may be implemented in hardware and/or software.

Figure 4:
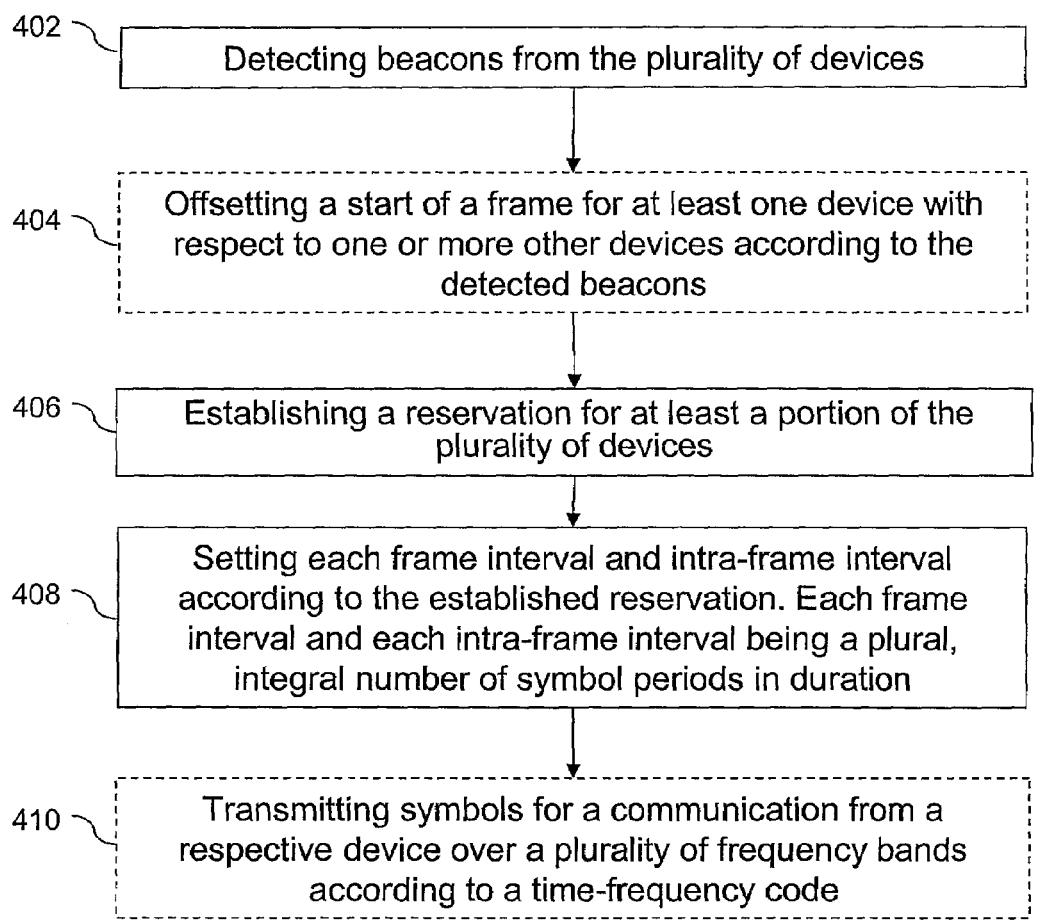
FIG. 4 is a flow chart of a control method for synchronization of a communications system in accordance with an embodiment of the present invention.

FIG. 4 depicts a flow chart of a control method for synchronizing communications among a plurality of devices in a communication system in accordance with an embodiment of the present invention.

At block 402, beacons from the plurality of UWB devices A, B and C in the communication system are detected. In the UWB communication system, each UWB device A, B and C may transmit/send a beacon during BP 210 of superframe 200, 201 and 202. Each UWB device A, B and C may detect/monitor beacons of other UWB devices A, B, and C in the BP 210 of superframe 200, 201 202. That is, UWB device A, B and C may create its BP 210 by sending a beacon. If one or more beacons of other UWB devices A, B and C are detected, for example, on a selected channel, the UWB device A, B and C may synchronize its BP 210 to existing beacons in the selected channel.

At optional block 404, the start of a frame for at least one UWB device A, B and C with respect to one or more other UWB devices A, B and C may be optionally offset according to the detected beacons. By determining the beacon timing of respective devices A, B and C among superframes 200, 201 and 202, frame intervals 260 of each UWB device A, B and C may be synchronized/offset to reduce or substantially eliminate collisions among UWB devices A, B and C in a band group 1-4. The frame interval 260 for transmitting one or more symbols for a first UWB device A responding with a beacon is established by device A in accordance with the determined timing of the beacons established by the other UWB devices B and C. A start of respective frame interval 260 for each successive UWB device B and C responding with a corresponding beacon is either aligned with that of first UWB device A, or, desirably, offset therefrom according to the established frame interval 260 of first UWB device A responding with the beacon. Offsets to the start of respective frame intervals 260 for successive devices responding with the beacon may be based on a predefined duration, for example, one or more symbol periods or, otherwise, may be dynamically set based on this predefined duration, adjusted for timing difference due to clock skews and propagation delays of the other UWB devices.

It is contemplated that the clock of the UWB devices A, B and C may adjust the timing of its own time reference (e.g., adjust the timing of its clock, to reduce or eliminate clock skews). For example, compensation for different clock rates of UWB devices A, B and C may be accomplished by checking timing of BP 210 at the beginning of each super frame and adjusting the transmission to that of the lower clock rate UWB devices.

Figure 1:
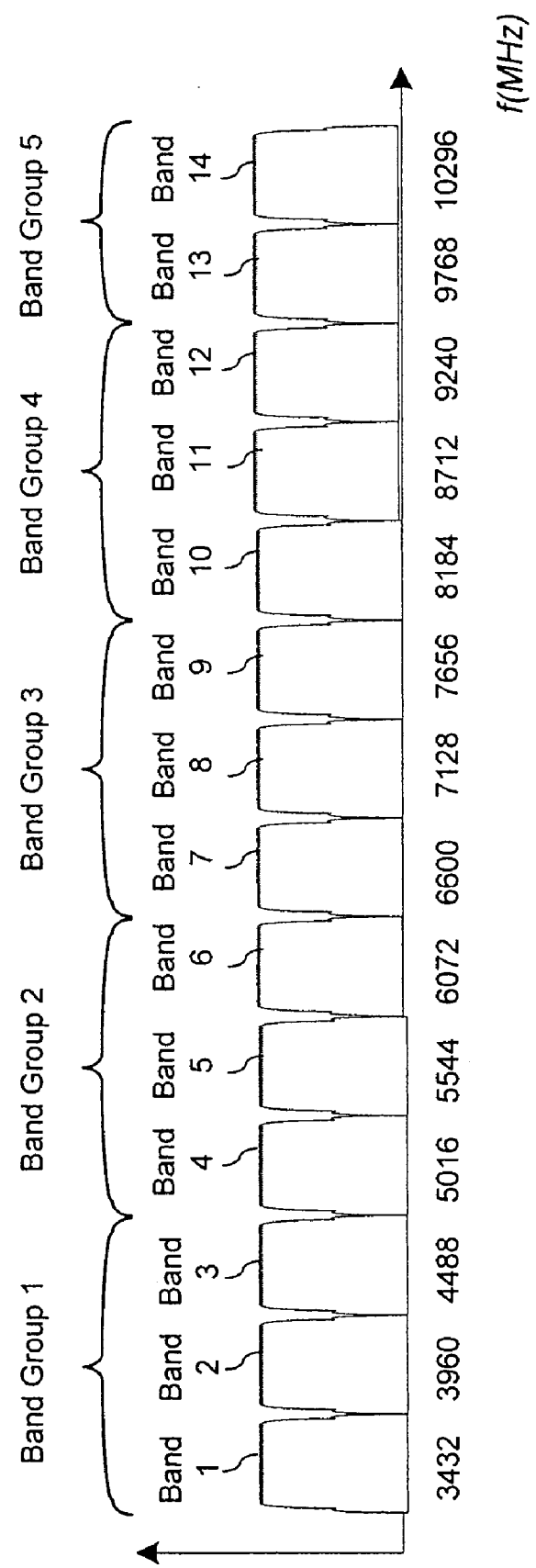
FIG. 1 (Prior Art) is a conceptual representation of a multi-band spectrum allocation for a UWB communication system.
Figure 2A:
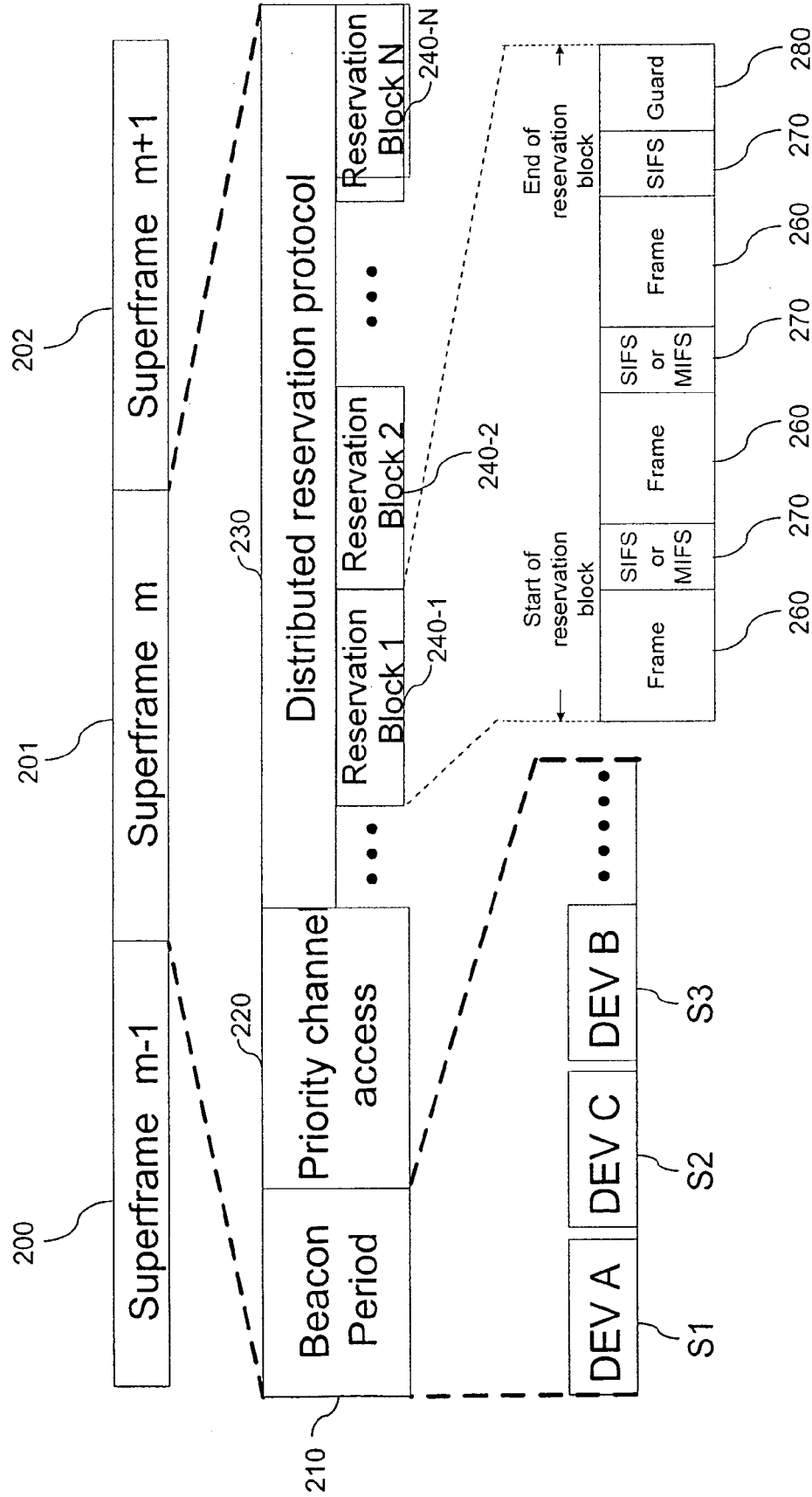
FIG. 2A (Prior Art) is a schematic diagram of a conventional superframe used for communications among a plurality of devices in the UWB communication system.
Figure 2B:
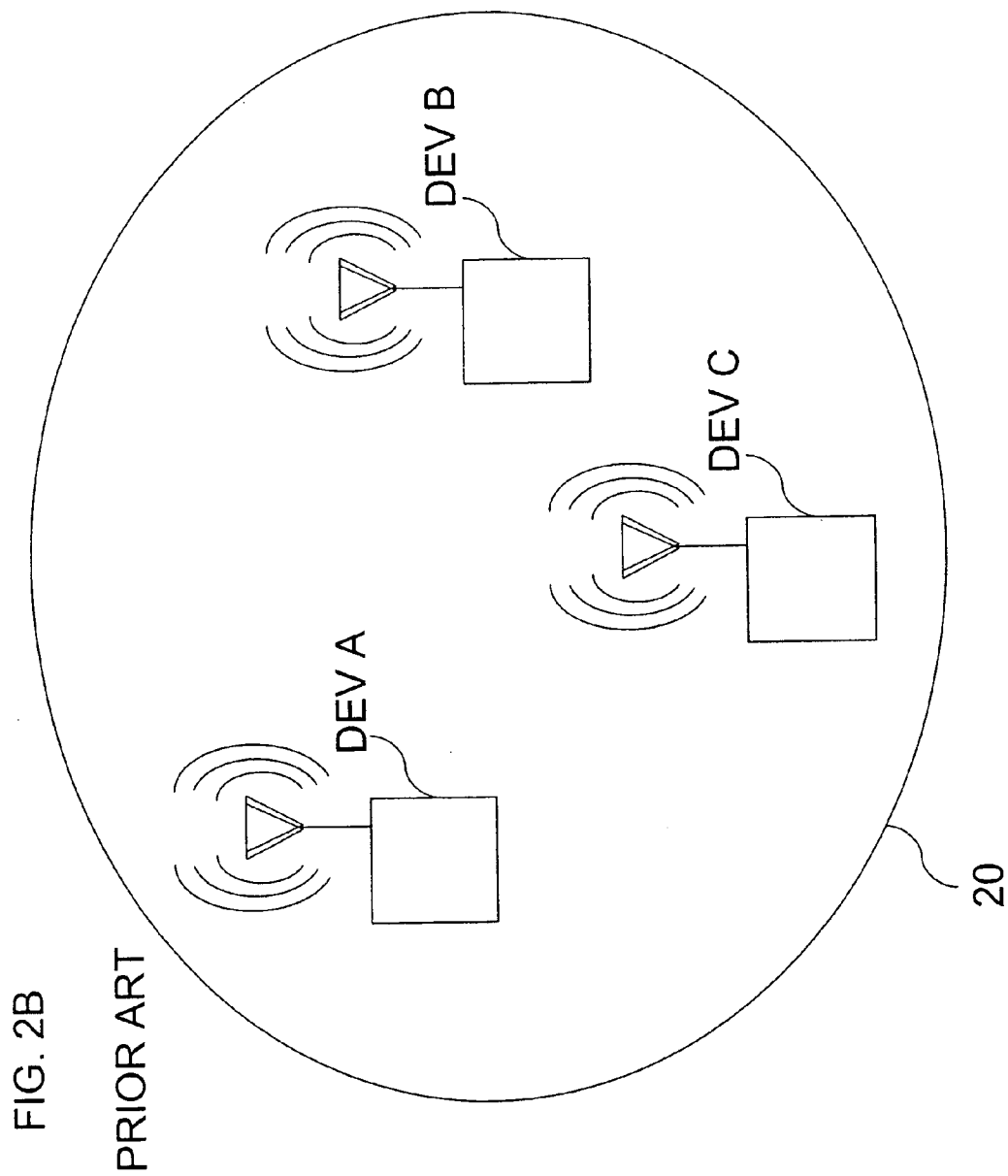
FIG. 2B (Prior Art) is an illustration of an exemplary grouping of UWB devices.

At block 406, at least some of the UWB devices A, B and C transmitting beacons, may establish a reservation. Each reservation may refer to a respective frame interval 260 to be used to transmit symbols from UWB device A, B and C making the reservation to one or more other UWB devices A, B and C in the communications system. Reservations may be made in one or more reservation blocks 240-1, 240-2 . . . 240-N of DRP 230, shown in FIG. 2A.

At block 408, each frame interval 260 and intra-frame interval 270 and 280 may be set according to the established reservation. Each frame interval and intra-frame interval may include a plural, integral number of symbol periods. That is, by setting a duration of each frame interval 260 and intra-frame interval 270 and 280 to be plural, integral number of symbol periods, synchronization between UWB devices A, B and C frame-by-frame may be maintained so that collision due to mis-timing of transmissions among the plurality of UWB devices A, B and C may to reduced or substantially eliminated.

It is contemplated that the plural, integral number of symbol periods may be the time-frequency code (TFC) period, for example, a repetition period for the TFC (e.g., 3 symbol periods as illustrated below in FIG. 5A). Moreover, the plural, integral number of symbol periods may be different for different sub-intervals of reservation blocks 240-1, 240-2 . . . 240-N, so long as each longer sub-interval is a integer multiple of each shorter sub-interval. That is, for example, each frame interval may be N number of symbol periods and each intra-frame interval may be M number of symbol periods, where N and M are not equal. Each intra-frame interval may include either (1) an interval between frames 270 or (2) a guard interval 280 at an end of reservation block 240-1, 240-2 . . . 240-N. Such a structure of reservation block 240-1, 240-2 . . . 240-N ensures that the duration of reservation block 240-1, 240-2 . . . 240-N for each UWB device/channel is such that frames 260 remain synchronized from either one frame 260 to the next frame 260 or from one reservation block to the next reservation block.

At optional block 410, during frame interval 260, symbols may be transmitted, for example, by OFDM techniques or other time-frequency hopping techniques used in multi-band communication systems. Such communication from UWB device A, B and C over a plurality of frequency bands 1-3 may be implemented according to respective TFCs.

Each TFC defines the number of bands and the order of those bands to be used. Different channels have different order of band usage. Each piconet may choose one operating channel that is different from other piconets to avoid collision. Because band group 1 has the longest coverage range of the plurality of band groups 1-5 due to its lower transmission frequencies and is the easiest implementation among the plurality of band groups 1-5, band group 1 may become the most highly used in deployments, in particular, for initial deployments. As there are only 3 frequency bands in band group 1, a maximum of 3 SOPs may be supported, assuming they are synchronized or substantially synchronized.

Each UWB device may time-frequency hop to a different frequency band and may transmit symbols according to the TFC. This process may be repeated until communications between one or more UWB devices A, B and C are completed. Collisions among or between symbols from two or more different UWB devices A, B and C may occur when two or more UWB devices A, B and C simultaneously communicate on a common frequency band (e.g., some portion of the transmission from UWB devices A, B and C occur simultaneously in the same frequency band).

Moreover, the TFC for each UWB device A, B and C in the communication system may be determined according to an order of response of the detected beacons from the plurality of UWB devices A, B and C by matching first UWB device A to respond with a beacon to a first frequency band (for example band 1) and subsequent UWB devices B and C to other respective bands (for example band 2 and 3, respectively) according to the number of frequency bands in the band group. It may be desirable to have the same number or fewer UWB devices than frequencies bands in the band group. For example, the TFC may include rotating the transmission frequency among a plurality of frequency bands for each UWB device while transmitting one or more symbols from these devices at each of the rotated transmission frequencies such that simultaneous transmissions by respective UWB devices are at different transmission frequencies.

Each of the UWB devices A, B and C that respond with a beacon may be set to transmit symbols according to a corresponding channel of the band group 1-4. That is, the TFC may establish a time-frequency hopping scheme coordinated among UWB devices A, B and C in a band group 1-4 to repeatedly adjust the frequencies for transmission of one or more successive symbols until, for example, the communication from respective devices A, B and C are completed.

FIGS. 5A and 5B are charts illustrating exemplary time-frequency codes in accordance with the present invention and represent one exemplary band group of a plurality of band groups.

For each band group, the time-frequency hopping scheme (e.g., TFC) may be established to prevent collisions between or among transmissions from two or more UWB devices A, B and C. For example, channels 1-3 may be established such that UWB device A, B and C may simultaneously communicate over different channels while, in a synchronized manner, repeatedly frequency hopping to other frequency bands 1-3. That is, for example as shown in FIG. 5A, (1) in a first symbol period T1, UWB device A may communicate over frequency band 1, UWB device B may communicate over frequency band 2 and UWB device C may communicate over frequency band 3; (2) in a second symbol period T2, UWB device A may communicate over frequency band 2, UWB device B may communicate over frequency band 3, and UWB device C may communicate over frequency band 1; (3) in a third symbol period T3, UWB device A may communicate over frequency band 3, UWB device B may communicate over frequency band 1, and UWB device C may communicate over frequency band 2.

As illustrated in FIG. 5A, the number of UWB devices A, B and C is equal to the number of frequency bands 1-3. It is contemplated, however, that any number of UWB devices may be simultaneously active, but desirably less than the number of frequency bands in the band group to reduce or substantially eliminate collisions between transmissions from these UWB devices.

FIG. 5B depicts another time-frequency hopping scheme (e.g., another TFC) in a more generalized manner for 4 or more UWB devices. It is understood that such a TFC represents a rotation of the frequencies bands for transmission of symbols. That is, a symbol may be transmitted for each respective device on a corresponding frequency band, the transmission frequency of each device may be adjusted to a next corresponding frequency band and another respective symbol for each respective device may be further transmitted on the next corresponding frequency band. This process may be repeated until communication from each device is completed. Moreover, the repeated adjustment of the transmission frequency of each device to each next corresponding frequency band may be coordinated between or among the plurality of devices based on which TFCs are predefined. The coordination of transmission of the plurality of UWB devices may include the establishment of a logical succession of the plurality of frequency bands for transmission such that adjustment of the transmission frequency band of each device occurs by following the established logical succession.

The logical succession may be a predefined frequency band hopping pattern for which the transmission frequency band of each device does not repeat until all or a portion of the plurality of frequency bands have been transmitted over for each device, or, otherwise may be logical succession from the transmission frequency band of each device to either (1) the next higher frequency band, where the lowest frequency band is defined as logically the next higher frequency band for the highest frequency band or (2) the next lower frequency, where the highest frequency band is defined as logically the next lower frequency band for the lowest frequency band. It is understood that certain frequency bands may be rendered inactive due to NBI and the TFC may be dynamically changed to accommodate such interference.

Figure 6:
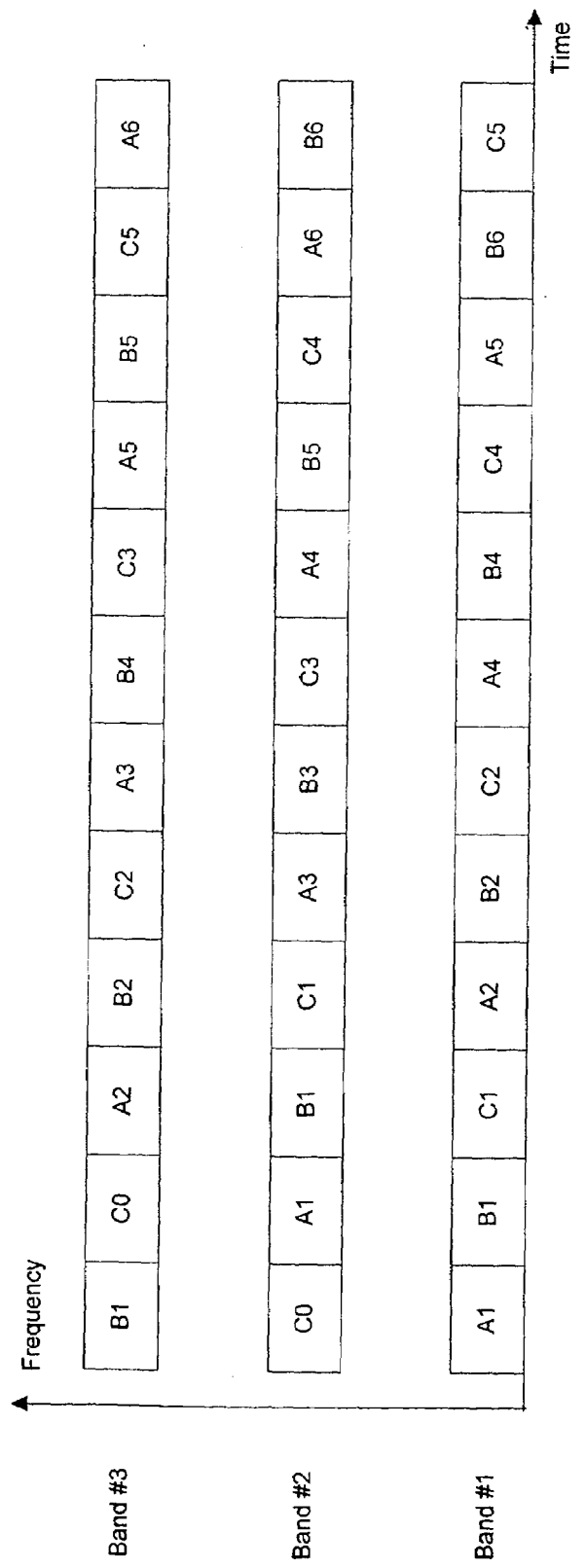
FIG. 6 is a timing diagram of exemplary communication from devices using time-frequency codes in FIG. 5A.

FIG. 6 is a timing diagram illustrating an exemplary communication from UWB devices using TFCs in FIG. 5A according to embodiments of the present invention. That is, by implementing the exemplary TFCs of FIG. 5A and ensuring synchronization of the frames of each UWB device A, B and C in a band group, throughput may be increased and collisions between transmissions may be reduced or substantially eliminated. For example, UWB device A may transmit A1, A2, A3, A4, A5 and A6 using channel 1 of the TFC of FIG. 5A (i.e., sequencing through frequency bands 1, 2 and 3); and UWB device B may transmit B1, B2, B3, B4, B5 and B6 using channel 2 of the TFC of FIG. 5A; and UWB device C may transmit C0, C1, C2, C3, C4 and C5 using channel 3 of the TFC of FIG. 5A. In such a case, as shown in FIG. 6, symbols may be repeated on different transmission frequencies (i.e., time-domain spreading); (1) to increase overall transmission success due to symbols being corrupted from, for example, NBI; (2) to maximize frequency diversity; and (3) to improve performance in the presence of other non-coordinated UWB devices. Although, FIG. 6 shows such repetition of symbols, symbols are not required to be repeated. Further, symbols may be repeated any number of times.

When devices in the same piconet (i.e., channel of a band group) are arranged to synchronize (e.g., coordinate) with other piconets, channel capacity may be increased without collision. If a plurality of UWB devices use a common TFC and each subsequent UWB device starts transmission with an offset of one-symbol, collisions may be reduced or substantially eliminated. For example, in band group 1, using the TFCs of FIG. 5A, three UWB devices may be multiplexed without collision. That is, the DRP may be allocated based on symbol offset (i.e., symbol level multiplexing) within channels.

To achieve such symbol offset, a unit smaller than a symbol may be used. Because symbols in time-domain include of a plurality of samples, samples may be used as a basic unit to achieve this symbol offset. A new Information Element (IE) may be used to achieve this symbol offset and other timing adjustments.

That is, to achieve band multiplexing, devices sharing the same reservation block 240-1, 240-2 . . . 240-N may start from different symbols to avoid collision. Starting symbols (e.g., to provide symbol offset) for each UWB device A, B and C in a band group may be controlled and the symbol offset may be announced in the BP 210 in addition to the reservation block 240-1, 240-2 . . . 240-N and channel 1-3 of the UWB device A, B and C. Symbol offset may occur only once at the start of DRP, and only the first frame 260 in DRP may be offset. Subsequent frames 260 in DRP follow the established TFC. For example, if the TFC is 3 symbol periods, offset of UWB devices A, B and C sharing a band group may be set to between 0 to 2 symbol periods.

DRP reservation may be aligned to reservation block 240-1, 240-2 . . . 240-N. Different UWB devices A, B and C may start from different reservation blocks 240-1, 240-2 . . . 240-N but multiplexed in the same band group. To ensure these devices which share a common reservation block starting with a common symbol offset, the reservation block may be an integer N number of TFCs in duration.

By synchronizing transmission of frames and providing a rotating time-frequency hopping scheme, the throughput for a SOP can be increased while reducing or substantially eliminating collisions from other SOPs.

FIGS. 7A-7B, 8A-8B, 9A-9B and 10A-10B are timing diagrams of exemplary communications from devices using various TFCs and frame synchronization techniques. FIGS. 7B, 8B, 9B and 10B illustrate reduced collisions compared to FIGS. 7A, 8A, 9A and 10A, respectively, when one or more embodiments of the present invention are implemented.

In FIGS. 7A, 7B, 8A, 8B, 9A, 9B, 10A and 10B, A, B and C represents devices and each block represents a symbol. Blocks with cross-hatching denote symbols that may be corrupted by a collision (i.e., coincident transmission from another device on a common frequency band). In some of these FIGs., symbol may be repeated on different bands for time-domain spreading. Although collisions may occur in some of the symbols on some frequency bands, it may be possible to recover these symbols from their duplicates transmitted over other frequency bands.

Figure 7A:
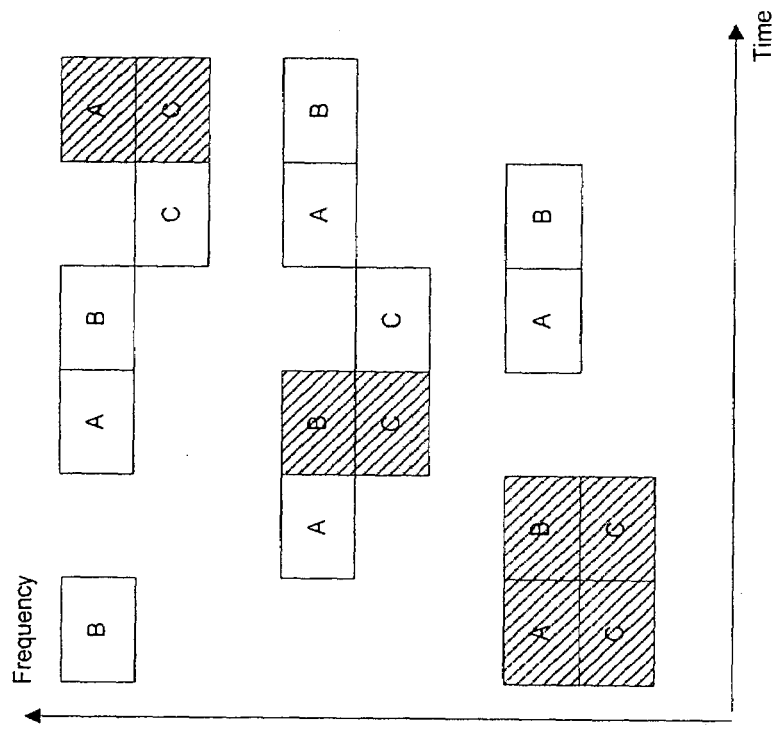
FIGS. 7A-7B, 8A-8B, 9A-9B and 10A-10B are timing diagrams of exemplary communications from UWB devices using various time-frequency codes and frame synchronization techniques, FIGS. 7B, 8B, 9B and 10B illustrating reduced collisions for exemplary embodiments of the present invention in comparison to reference FIGS. 7A, 8A, 9A and 10A, respectively.
Figure 7B:
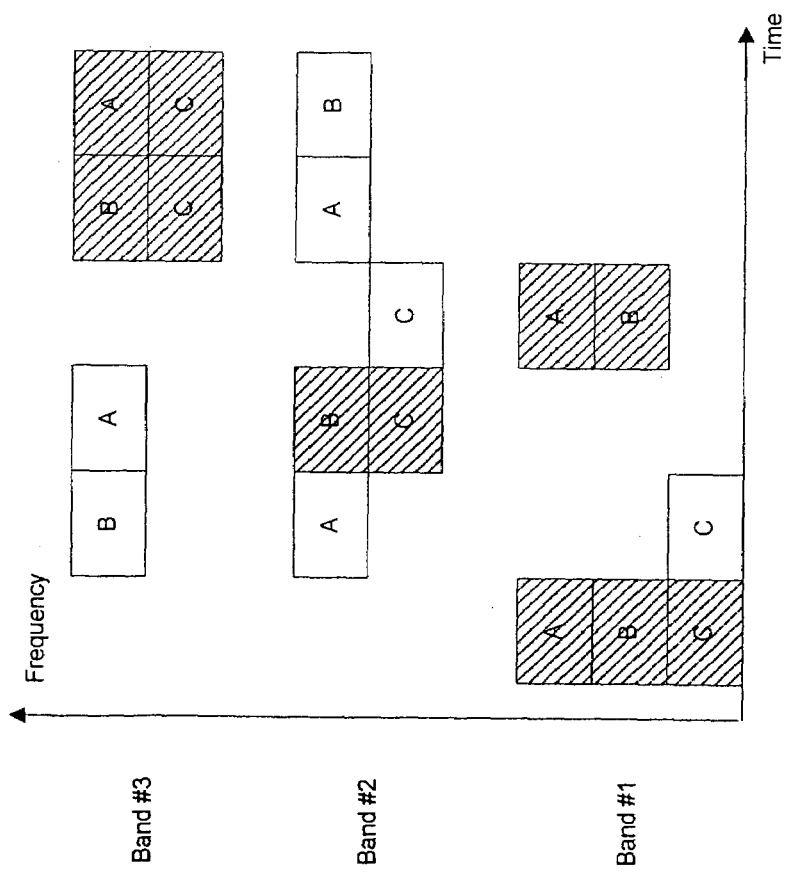

FIGS. 7A and 7B are timing diagrams illustrating exemplary collisions among transmission symbols using two different TFC schemes.

Referring to FIG. 7A, UWB devices A and B use channels 1 and 2, respectively, of the TFCs of FIG. 3A and synchronize the start of their symbols. UWB device C joins UWB devices A and B using channel 4 of the TFC of FIG. 3A and synchronizes the start of its symbols with that of UWB devices A and B with no symbol offset. In such a situation, the result of a collision analysis shows 11 collisions out of 18 symbols.

By contrast, in FIG. 7B, UWB devices A and B use channels 1 and 2, respectively, of the TFCs of FIG. 5A and synchronize the start of their symbols. UWB device C joins UWB devices A and B using channel 4 of the TFC of FIG. 3A and synchronizes the start of its symbols without symbol offset. In such a situation, the result of the collision analysis shows 8 collisions out of 18 symbols. Thus, by implementing the TFCs of FIG. 5A, a reduced number of collisions may be realized to improve transmission success.

Figure 8A:
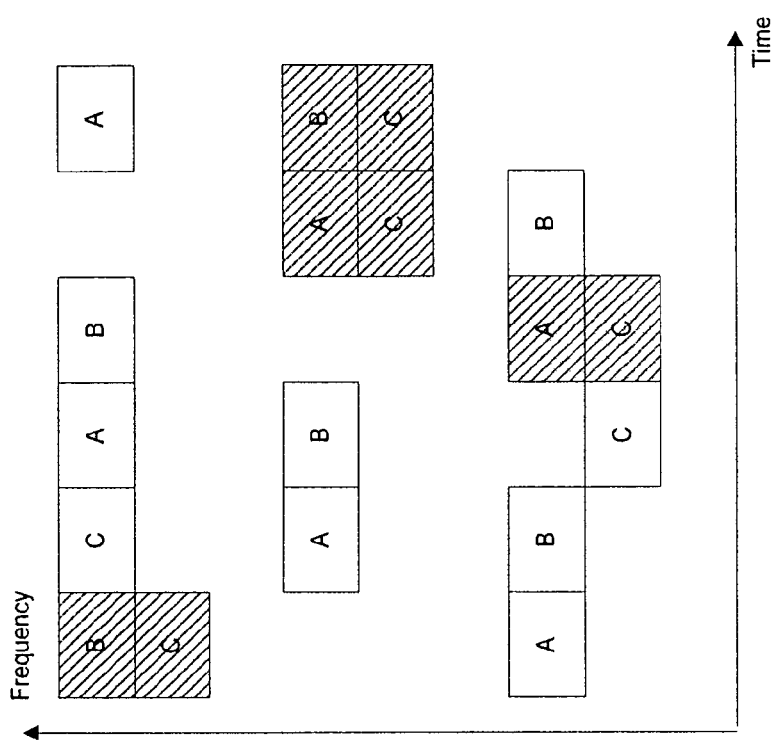
Figure 8B:
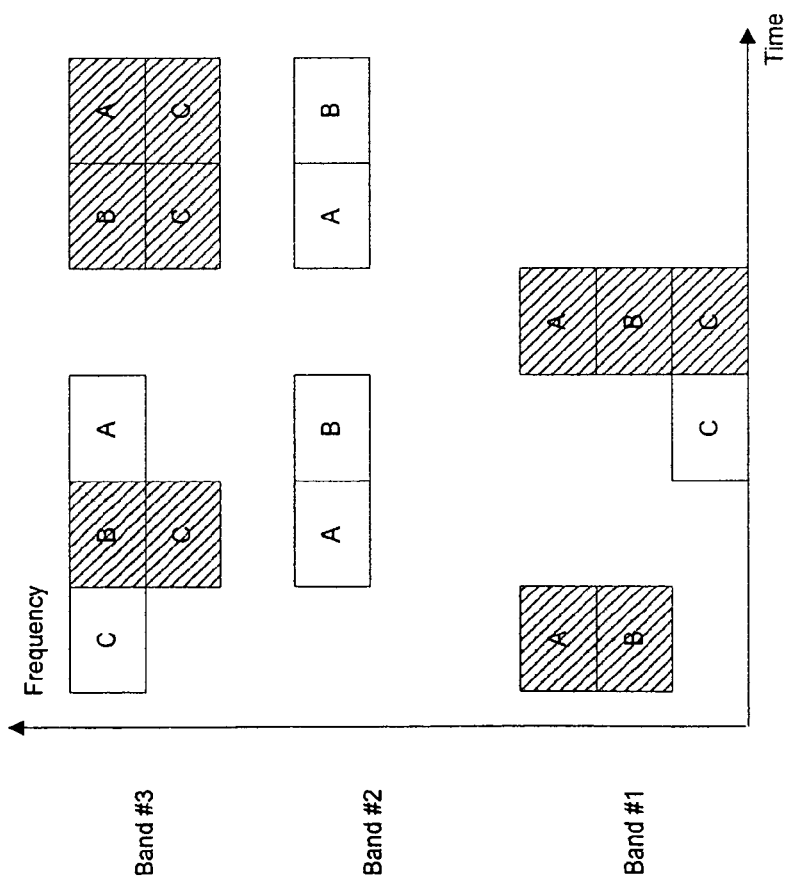

FIGS. 8A and 8B are timing diagrams illustrating other exemplary collisions among transmission symbols with UWB devices using a TFC scheme similar to that of FIGS. 7A and 7B, respectively. However, in this case, UWB device C includes a one-symbol offset.

Referring now to FIG. 8A, UWB devices A and B use channels 1 and 2, respectively, of the TFCs of FIG. 3A and synchronize the start of their symbols. UWB device C joins UWB devices A and B using channel 4 of the TFC of FIG. 3A and synchronizes the start of its symbols with that of UWB devices A and B with a one-symbol offset. In such a situation, the result of a collision analysis shows 11 collisions out of 18 symbols.

By contrast, in FIG. 8B, UWB devices A and B use channels 1 and 2, respectively, of the TFCs of FIG. 5A and synchronize the start of their symbols. UWB device C joins UWB devices A and B using channel 4 of the TFC of FIG. 3A and synchronize the start of its symbols with a one-symbol offset. In such a situation, the result of the collision analysis shows 8 collisions out of 18 symbols. Thus, by implementing the TFCs of FIG. 5A, a reduced number of collisions may be realized to improve transmission success.

Figure 9B:
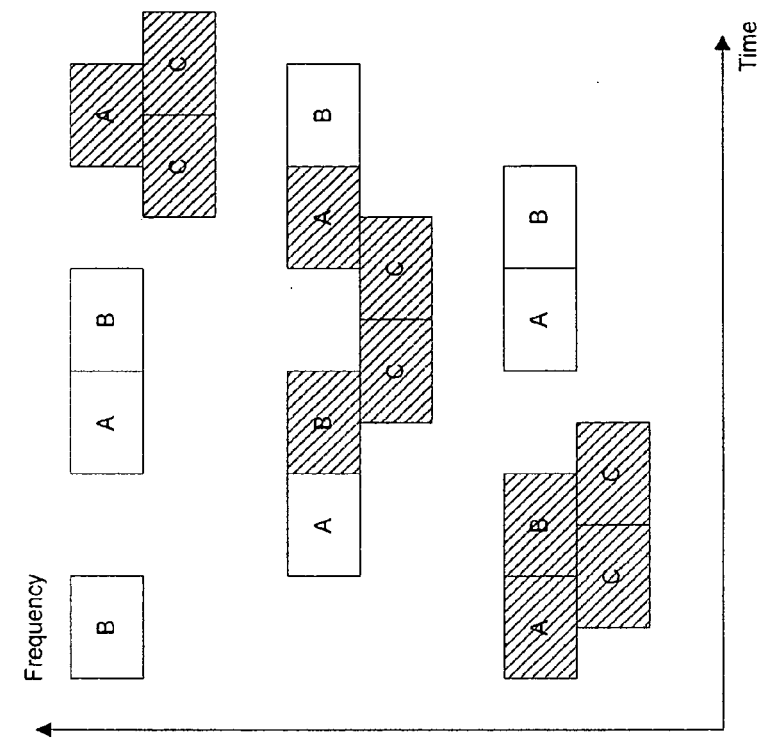
Figure 9A:
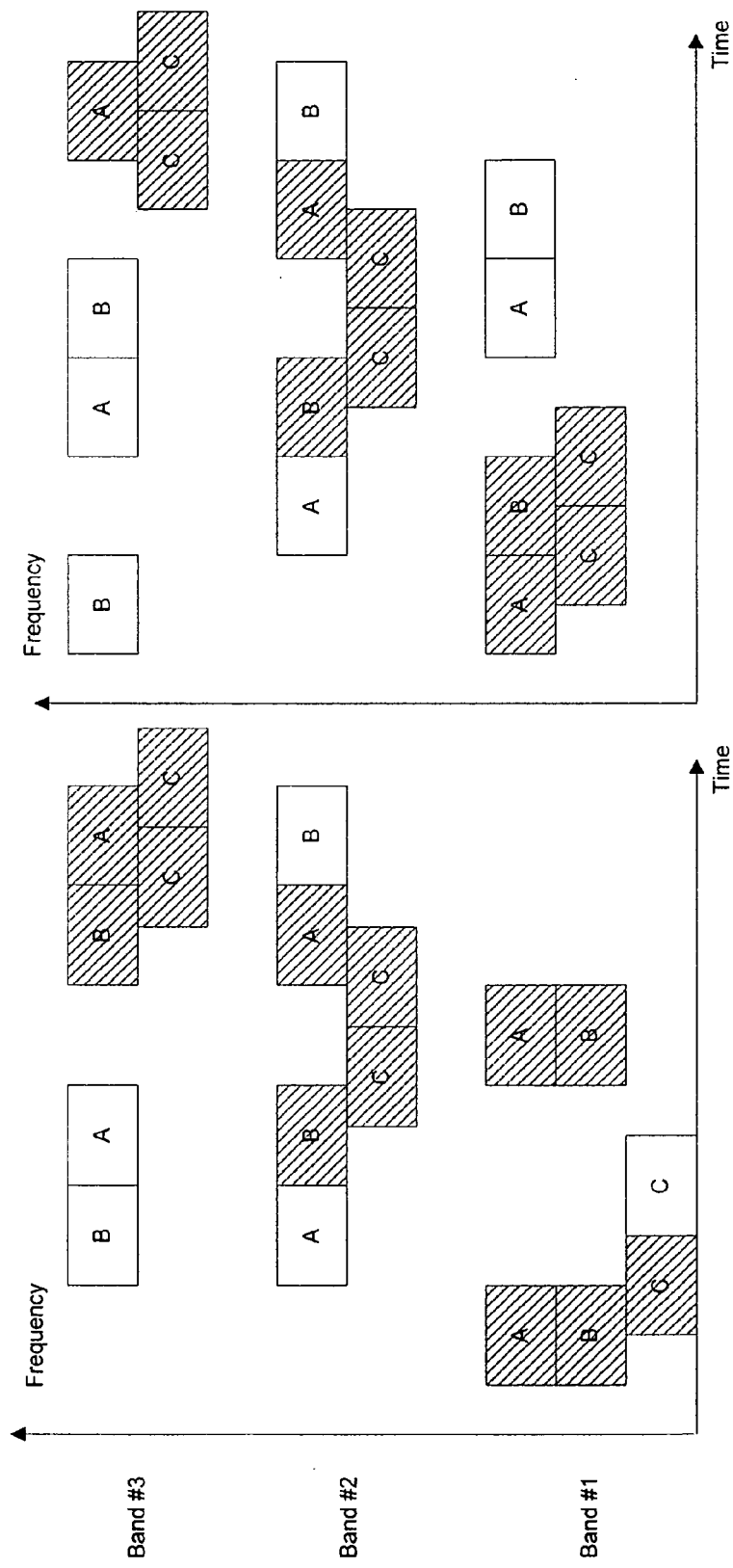

FIGS. 9A and 9B are timing diagrams illustrating further exemplary collisions among transmission symbols with UWB devices using the same TFC scheme as that of FIGS. 7A and 7B, respectively. UWB device C in FIGS. 9A and 9B, however, does not synchronize the start of it symbols with that of UWB devices A and B.

Referring now to FIG. 9A, UWB devices A and B use channels 1 and 2, respectively, of the TFCs of FIG. 3A and synchronize the start of their symbols. UWB device C joins UWB devices A and B using channel 4 of the TFC of FIG. 3A without synchronizing the start of its symbols with that of UWB devices A and B and without a symbol offset. In such a situation, the result of a collision analysis shows 13 collisions out of 18 symbols.

By contrast, in FIG. 9B, UWB devices A and B use channels 1 and 2, respectively, of the TFCs of FIG. 5A and synchronize the start of their symbols. UWB device C joins UWB devices A and B using channel 4 of the TFC of FIG. 3A without synchronizing the start of its symbols with that of UWB devices A and B and without a symbol offset. In such a situation, the result of the collision analysis shows 11 collisions out of 18 symbols. Thus, by implementing the TFCs of FIG. 5A, even without synchronizing symbols between UWB device C and UWB devices A and B, a reduced number of collisions may still be realized to improve transmission success.

Figure 10A:
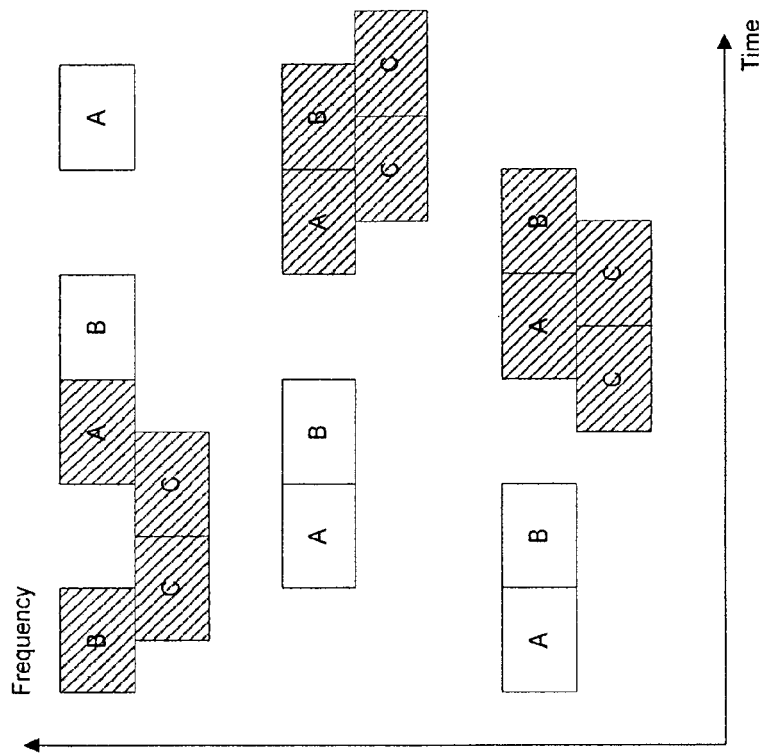
Figure 10B:
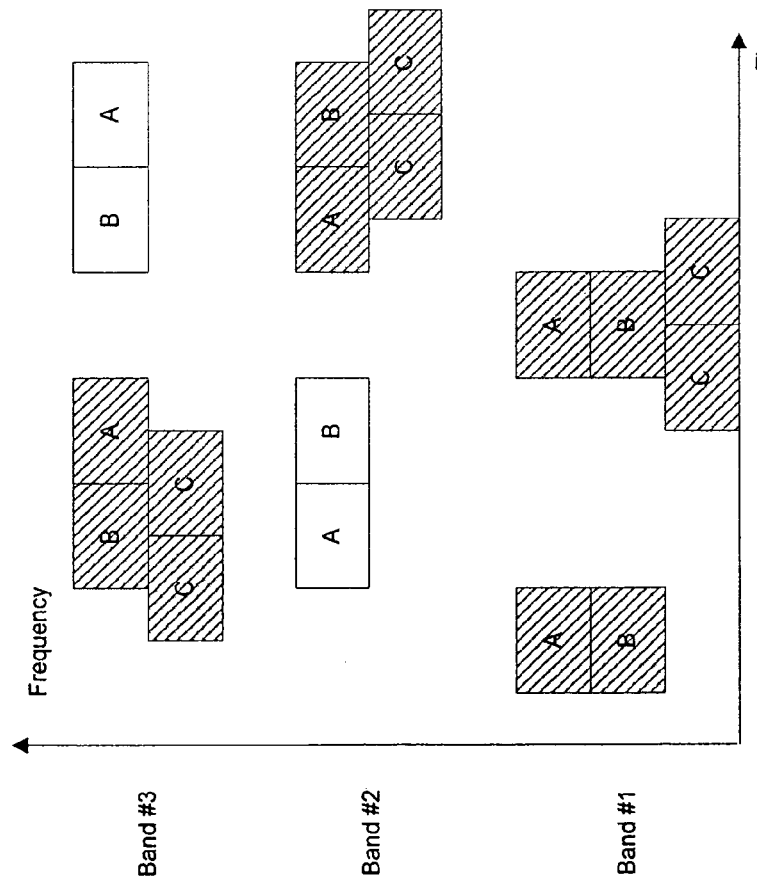

FIGS. 10A and 10B are timing diagrams illustrating other exemplary collisions among transmission symbols with UWB device using the same TFC scheme as that of FIGS. 8A and 8B, respectively. UWB device C in FIGS. 10A and 10B, however, does not synchronize the start of its symbols with that of UWB devices A and B.

Referring now to FIG. 10A, UWB devices A and B use channels 1 and 2, respectively, of the TFCs of FIG. 3A and synchronize the start of their symbols. UWB device C joins UWB device A and B using channel 4 of the TFC of FIG. 3A without synchronizing the start of its symbols with that of UWB devices A and B and with a one-symbol offset. In such a situation, the result of a collision analysis shows 14 collisions out of 18 symbols.

By contrast, in FIG. 10B, UWB devices A and B use channels 1 and 2, respectively, of the TFCs of FIG. 5A and synchronize the start of their symbols. UWB device C joins UWB device A and B using channel 4 of the TFC of FIG. 3A without synchronizing the start of its symbols with that of UWB devices A and B and with a one-symbol offset. In this situation, the result of the collision analysis shows 12 collisions out of 18 symbols. Thus, by implementing the TFCs of FIG. 5A, without synchronizing symbols between UWB device C and UWB devices A and B, a reduced number of collisions may still be realized to improve transmission success.

As is readily understood from these figures, if symbols between devices/channels/SOPS are not aligned, collision patterns may be increased reducing performance of the communication system.

Although the invention has been described in terms of a UWB multi-band communication system, it is contemplated that the it may be implemented in software on microprocessors/general purpose computers (not shown). In this embodiment, one or more of the functions of the various components may be implemented in software that controls a general purpose computer. This software may be embodied in a computer readable carrier, for example, a magnetic or optical disk, a memory-card or an audio frequency, radio-frequency, or optical carrier wave.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A control method for synchronizing communications between or among a plurality of devices in a communication system; the method comprising the steps of:
   a) detecting beacons from the plurality of devices in the communication system;
   b) establishing a reservation for at least a portion of the plurality of devices in the communication system, each reservation being a frame interval in which to transmit symbols from one device to one or more other devices in the communications system; and
   c) setting each frame interval and a corresponding intra-frame interval according to the established reservation, each frame interval and each intra-frame interval being a plural, integral number of symbol periods in duration.

2. The control method of claim 1, wherein each frame interval includes N symbol periods and each intra-frame interval includes M symbol periods, where N and M are integers and are not equal.

3. The control method of claim 1, further comprising the steps of:
   d) determining, by each device, a time-frequency code for each of the other devices in the communication system according to the detected beacons from the other devices; and
   e) during a frame interval, transmitting symbols for a communication from a respective device over a plurality of frequency bands according to the determined time-frequency codes.

4. The control method of claim 3, wherein step (d) of determining the time-frequency code for each of the devices in the communication system includes the step of:
   setting each of the devices to respond with a beacon to transmit symbols according to a channel of the time-frequency code.

5. The control method of claim 4, wherein step (e) of transmitting symbols includes the steps of:

adjusting the transmission frequency according to the time-frequency code;
transmitting one or more successive symbols in the frame at the adjusted transmission frequency; and
repeating the adjusting and transmitting steps until the communication from the respective device is completed.

6. The control method of claim 1, further comprising the step of:
   d) offsetting a start of a frame for at least one device with respect to one or more other devices according to the detected beacons.

7. The control method of claim 1, further comprising the steps of:
   transmitting a symbol for each respective device on a corresponding frequency band;
   adjusting the transmission frequency of each device to a next corresponding frequency band and further transmitting another respective symbol for each respective device on the next corresponding frequency band; and
   repeating the adjusting and further transmitting step until communication from each device is completed.

8. The control method of claim 7, wherein the repeated adjusting of the transmission frequency of each device to each next corresponding frequency band is coordinated between or among the plurality of devices based on predefined time-frequency codes.

9. The control method of claim 8, wherein the coordination of transmission of the plurality of devices includes:
   establishing a logical succession of the plurality of frequency bands; and
   adjusting the transmission frequency band of each device by following the established logical succession.

10. The control method of claim 9, wherein the adjustment of the transmission frequency of each device by following the logical succession established comprises:
    adjusting the transmission frequency band of each device to either (1) the next higher frequency band, where the lowest frequency band is defined as logically the next higher frequency band for the highest frequency band or (2) the next lower frequency, where the highest frequency band is defined as logically the next lower frequency band for the lowest frequency band.

11. The control method of claim 9, wherein the transmission frequency of each device does not repeat until all of the plurality of frequency bands have been transmitted by each device.

12. The control method of claim 7, wherein the plurality of devices is less than the plurality of frequency bands in number.

13. The control method of claim 1, further comprising the steps of: determining timing of beacons of respective devices;
    establishing the frame interval for transmitting one or more symbols for a first device by responding with a beacon in accordance with a determined timing of the beacons from other devices; and
    synchronizing a start of the respective frame intervals for each successive device responding with a corresponding beacon according to the established frame interval.

14. The control method of claim 13, further comprising the step of positioning the start of the respective frame interval for successive devices responding with the beacon based on a predefined symbol duration.

15. The control method of claim 1, wherein step (c) of setting each frame interval and each intra-frame interval includes establishing each frame and intra-frame duration to be an integral number of time-frequency code intervals.

16. The control method of claim 1, wherein the infra-frame intervals include either (1) intervals between frames or (2) intervals between frames and guard intervals at an end of a reservation by a respective device.

17. The control method of claim 1, wherein step (e) of transmitting symbols includes OFDM transmitting of symbols.

18. A method of controlling synchronization of a plurality of devices during a plurality of frames of a superframe in a communication system; the method comprising the steps of:
 a) detecting, by each device, beacons from the plurality of other devices in the communication system;
 b) setting each frame interval and each intra-frame interval of the superframe to be a plural, integral number of symbol periods in duration; and
 c) aligning a start of each of the frame intervals of the superframe according to the detected beacons.

19. A control method of band multiplexing communications from the plurality of devices in the communication system, the method comprising the steps of:
 synchronizing frame intervals among the plurality of devices, frame interval being intervals in which symbol data is transmitted, by setting each frame interval and each intra-frame interval to be a plural, integral number of symbol periods in duration;
 rotating, by each device, between or among a plurality of frequency bands; and
 transmitting one or more symbols from each device at each of the rotated transmission frequencies such that simultaneous transmissions by respective devices are at different transmission frequencies.

20. A computer readable storage medium including software that is configured to control a general purpose computer to implement a method embodied in a computer readable medium to control communication from a device in the communication system, the method comprising the steps of:
 a) detecting beacons from a plurality of other devices in the communication system;
 b) establishing a reservation for the device, the reservation being a frame interval in which to transmit symbols from the device to one or more other devices in the communications system; and
 c) setting each frame interval and a corresponding intra-frame interval according to the established reservation, each frame interval and each intra-frame interval being a plural, integral number of symbol periods in duration.

* * * * *